United States Patent [19]
Hafner

[11] Patent Number: 5,522,258
[45] Date of Patent: Jun. 4, 1996

[54] METHOD FOR DETECTING MISFIRES IN AN INTERNAL COMBUSTION ENGINE

[75] Inventor: Sigrid Hafner, Stuttgart, Germany

[73] Assignee: Robert Bosch GmbH, Stuttgart, Germany

[21] Appl. No.: 316,186

[22] Filed: Sep. 30, 1994

[30] Foreign Application Priority Data

Oct. 2, 1993 [DE] Germany .......................... 43 33 698.1

[51] Int. Cl.⁶ ................................................. G01M 15/00
[52] U.S. Cl. ..................................... 73/117.3; 364/431.08
[58] Field of Search .................................... 73/116, 117.3, 73/118.1; 123/419, 436; 364/431.07, 431.08

[56] References Cited

U.S. PATENT DOCUMENTS

| | | | |
|---|---|---|---|
| 5,197,325 | 3/1993 | Tamura et al. | 73/117.3 |
| 5,245,866 | 9/1993 | Hashiguchi et al. | 73/117.3 |
| 5,275,037 | 1/1994 | Nakayama et al. | 73/117.3 |
| 5,307,671 | 5/1994 | Akase | 73/117.3 |
| 5,309,756 | 5/1994 | Osawa et al. | 73/116 |
| 5,337,240 | 8/1994 | Nakagawa et al. | 73/117.3 |

FOREIGN PATENT DOCUMENTS 4138765  7/1992  Germany .

*Primary Examiner*—Richard Chilcot
*Assistant Examiner*—Eric S. McCall
*Attorney, Agent, or Firm*—Kenyon & Kenyon

[57] ABSTRACT

A method for misfire recognition in an internal combustion engine, with the crankshaft of the internal combustion engine having a sensor for determining the rpm and with at least one crankshaft segment being established for each cylinder. By means of the rpm, the segment time ($t_{SEG}$) is determined and then the differences ($\Delta t_{SEG}$) are determined from two successive times $t_{SEG(n)}$, $t_{SEG(n-1)}$. In a first phase, a plurality of processing units are calculated from the collected values for each operating point and each possible error, with each of these processing units having a weighting vector and information (I). These weighting vectors are stored in a storage unit of the internal combustion engine. In a second phase, during operation of the internal combustion engine under operating conditions, sample vectors are calculated from the current values then being picked up, the vectors being compared with the individual weighting vectors of the processing units that have been learned. The processing unit that has the shortest distance from the weighting vectors of the currently calculated sample vectors is selected. Then, the information from the processing unit is output as a diagnosis of the functioning of the internal combustion engine.

5 Claims, 6 Drawing Sheets

METHOD FOR DETECTING MISFIRES IN AN INTERNAL COMBUSTION ENGINE

FIELD OF THE INVENTION

The present invention relates to a method for detecting misfires in an internal combustion engine, throughout the entire operating range of the engine.

BACKGROUND OF THE INVENTION

A method for detecting misfires in an internal combustion engine is known from German Patent No. DE 41 38 765, in which the time between two combustions, referred to as the segment duration, is detected and the roughness value of the internal combustion engine is calculated from the values determined, with the aid of physical models. If a calculated roughness value exceeds an established characteristic value, it is determined that a misfire has occurred. The fixed characteristic value is adjusted to the load and rpm ranges of the internal combustion engine. This method does not provide sufficient detection of misfires over the entire operating range of the internal combustion engine. For example, when the engine is operating with a low load at high rpm, the segment durations are very short, so that the recognition reliability can be reduced. In addition, determination of the characteristic values for different rpm and load ranges is very expensive.

It is also known that sensors can be provided in the internal combustion engine for recognizing misfires, the sensors recording, for example, the ignition voltage transformed on the primary side, or located in the combustion chamber where they measure the pressure or generate knock signals, for example. However, such sensors increase the cost of manufacturing the engine.

SUMMARY OF THE INVENTION

The method according to the present invention has the advantage that existing sensors and their signals can be used, and it supplies reliable results over the entire operating range. The sensor associated with the crankshaft to detect the crankshaft angle simultaneously supplies the output values for evaluation to determine whether a misfire has occurred or not. Another advantage is that, with the method according to the present invention, classification results are also obtained which provide information on the cause of the roughness of the engine. The advantage of obtaining this information is that diagnosis of engine operation is possible and malfunctions can be detected at a very early stage.

It is especially advantageous that the use of safety thresholds was introduced, because in contrast to the previously known calculation model, fewer processing units are required and freak values will not falsely indicate a misfire. In addition, the use of safety thresholds makes it possible to prevent non-misfires, which resemble misfires, from being incorrectly classified as misfires.

DETAILED DESCRIPTION

Figure 1:
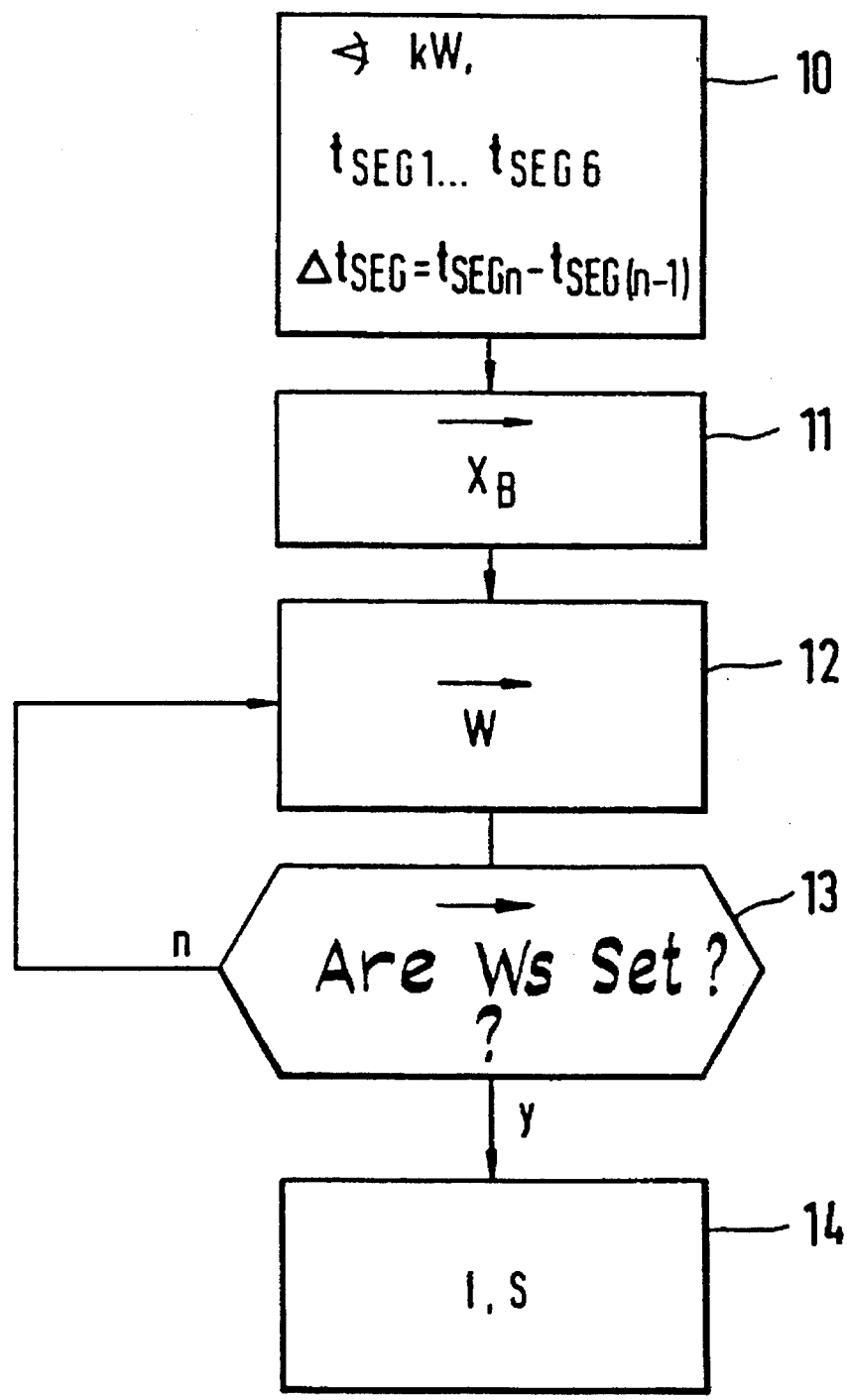
FIG. 1 shows a flow diagram of the training phase and verification phase of the Kohonen model in a theoretical representation.

Referring to FIG. 1, comparative values are calculated from the detected values and stored in the control device. In a first step 10, the crankshaft angle and the segment times for the individual operating points of the internal combustion engine are determined and the differences of the segment times are calculated. These values are determined for every type of engine and for the individual operating points. These values form the starting values for the model calculation, with a model consisting of individual processing units, as described later with reference to FIG. 6.

Each processing unit contains information I that permits statements to be made about the nature of a detected error. In a subsequent step 11, sample model vectors $\rightarrow/x_B$ are calculated from the values determined previously, with a sample model vector being determined by six individual values $x_{B1}, x_{B2}, x_{B3}, x_{B4}, x_{B5}$ and $x_{B6}$. The determination of a sample model vector based on additional values, or based on only some of the values is also possible. Several sample model vectors $\rightarrow/x_B$ determine the location of a point in the model, with each individual point being designated as a processing unit and its information I consisting for example of ignition misfire, combustion in order, poor combustion, or lack of combustion.

The individual values of a sample model vector can be calculated from six measured values with six segment durations, and additional measured values can be taken into account as well. These six measured values represent the differences in segment durations and are calculated as follows:

$$x_{B1}=(t_{SEG}(n-1)-t_{SEG}(n-3))/2$$

$$x_{B2}=(t_{SEG}(n)-t_{SEG}(n-1))$$

$$x_{B3}=(t_{SEG}(n+1)-t_{SEG}(n))$$

$$x_{B4}=(t_{SEG}(n+2)-t_{SEG}(n+1))$$

$$x_{B5}=(t_{SEG}(n+3)-t_{SEG}(n+2))$$

$$x_{B6}=(t_{SEG}(n-p+z)-t_{SEG}(n'p))/z$$

Here $x_{Bi}$ represents an individual value, $t_{SEG}(n)$ represents the segment duration, z is the number of cylinders, and p is a constant that depends on the cylinders, with the following conditions applying:

For: $z=4, p=1$ $z=6, p=2$ $z=8, p=3$.

The processing unit contains an information value I. For each rpm and load range, several processing units of ignition misfires and non-misfires are prepared. All processing units together form the training model. In a subsequent step 12, from a number of sample model vectors $x_B$, a weighting vector $\rightarrow$/w required for each processing unit can be calculated, using six individual values, $w_1$, $w_2$, $w_3$, $w_4$, $w_5$, and $w_6$.

Figure 4:
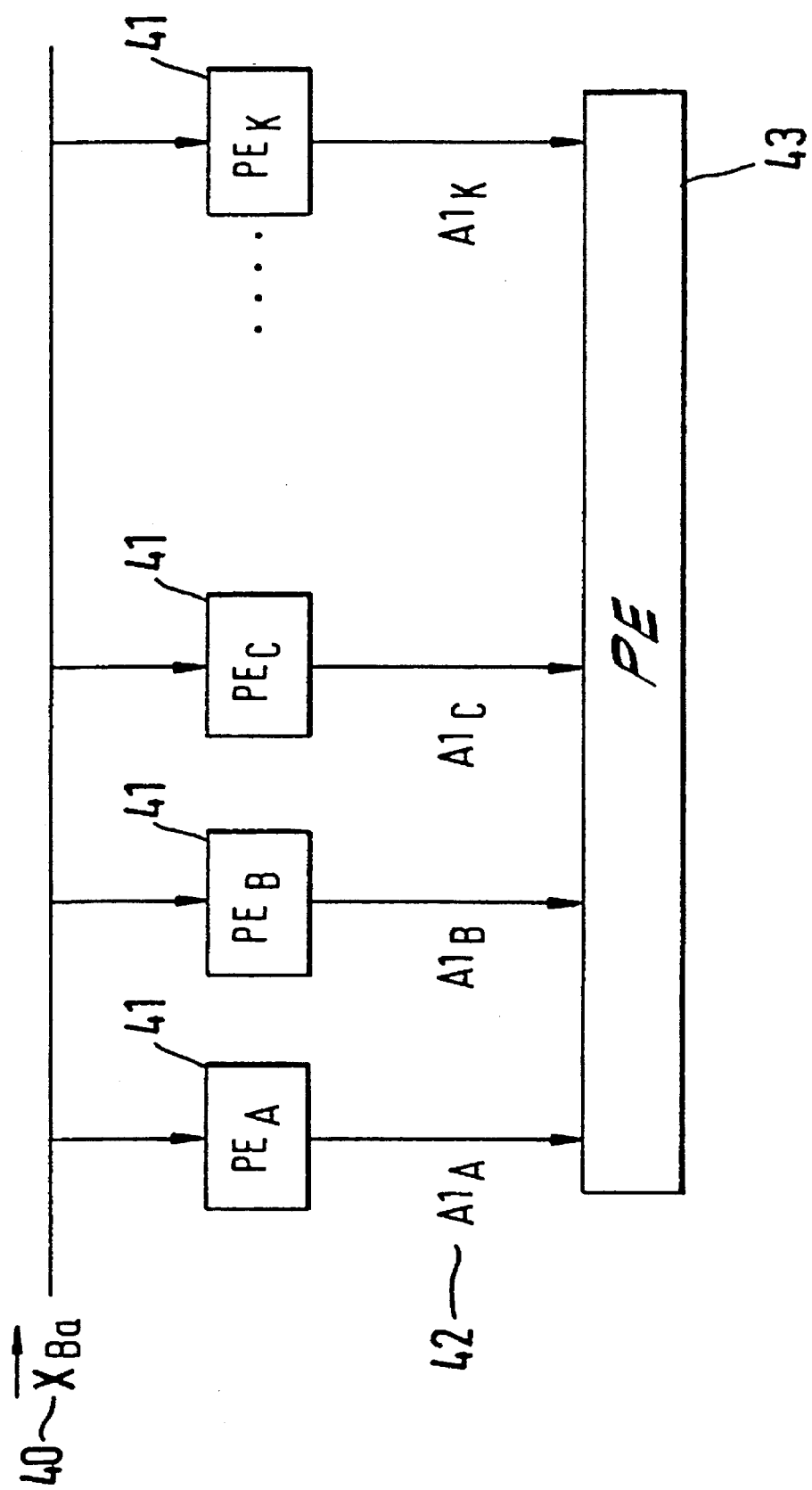
FIG. 4 shows a schematic diagram of the choice of the processing unit with the smallest distance from the currently calculated sample vector.

This is implemented in the embodiment using the Kohonen algorithm, and is explained in detail in FIG. 4. However, other calculation models and algorithms could be used. After adaptation of the weighting vectors, this model can be used in the working phase as a classifier. Each processing unit contains an information value I. Thus, for example, the value 0 can stand for a non-misfire, 1 for a misfire, and other values in a continuous value range between 0 and 1 for poor combustion or rough running due to a poor road surface. Here certain class ranges are developed independently, with each processing unit representing a certain sample model vector and containing certain information I. These processing units compete with one another. The individual processing units are adapted so they become sensitive to features in the sample model vectors and, in a later phase, to features in the input vectors formed.

In the next step 13, a test is conducted to determine whether the fixed weighting vectors are set so that they permit allocation and determination of the current values. This is accomplished, for example, by a plausibility comparison. If this is not the case, the process returns to step 12 and the weighting vectors are established once again. If the weighting vectors in step 13 are in order, recognition takes place in step 14; in other words, the information I of the processing unit and corresponding safety values S are determined. These safety values S, with each processing unit having one safety value, offer the advantage that a freak data value does not produce false information.

Figure 2:
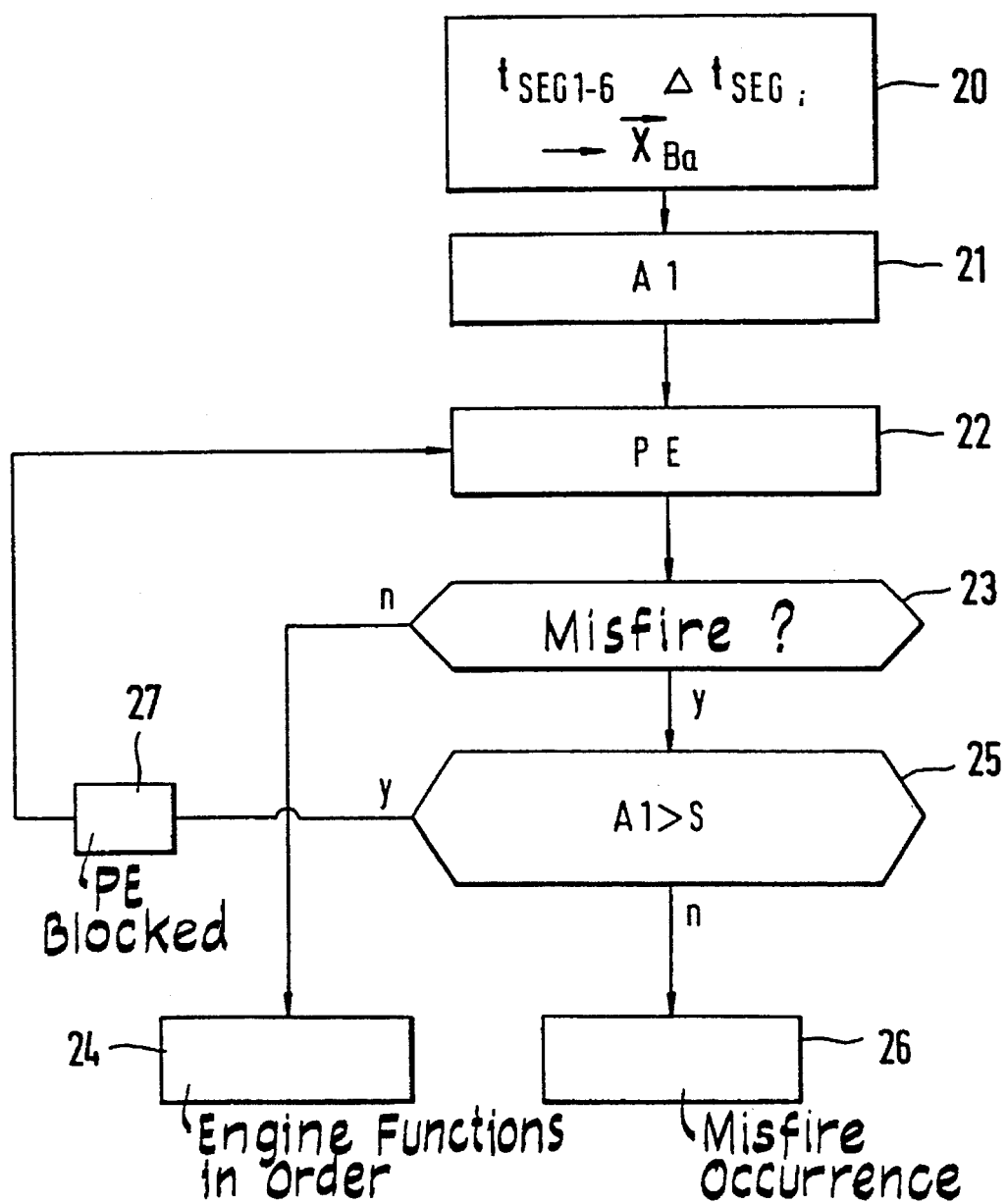
FIG. 2 shows a flow diagram of the working phase taking place in a control device to determine the existence of misfires in the internal combustion engine based on the further-developed Kohonen model.

Referring now to FIG. 2, there is shown a flowchart for the work phase as it proceeds in the control unit. In step 20, the momentary segment durations are determined and the differences between the segment durations are calculated. The current sample vector $\rightarrow$/$x_{Ba}$ is then formed from these values. In the next step 21, an interval measurement A1 between the weighting vector of each processing unit and the currently formed sample vector is calculated. The weighting vector is then the weighting vector $\rightarrow$/w determined in the training phase. In the next step 22, processing unit PE is selected which has the shortest distance from the current sample vector.

In step 23, information I of processing unit PE is evaluated as to the existence of a misfire. If the information does not suggest a misfire, then the next step 24 relays the information "no misfire, therefore engine functions in order." If information I in step 23 indicates a misfire, then in the next step 25 a check is conducted to determine whether the spacing signal A1 of processing unit PE is within the stated safety value S of processing unit PE. If the spacing signal is greater than the safety value, then the next step is step 27. In step 27, processing unit PE, which was previously selected, is blocked for the next selection until a new sample vector is processed. In the next step 22, a processing unit is selected from the remaining processing units and further steps are executed according to the stated method.

The classification result is reached when either a processing unit with the information "non-misfire" or a processing unit with the processing information "misfire" whose safety interval is greater than its spacing signal A1 is selected. Using this method, freak signals that may appear can be negated, so that false detection of a misfire does not occur. In addition, the number of processing units required as a model can be minimized.

If in step 25 the spacing signal is not greater than the safety value, then the next step is step 26. Here the information that a misfire has occurred is output. The preceding algorithm is run during each combustion of the internal combustion engine.

Figure 3:
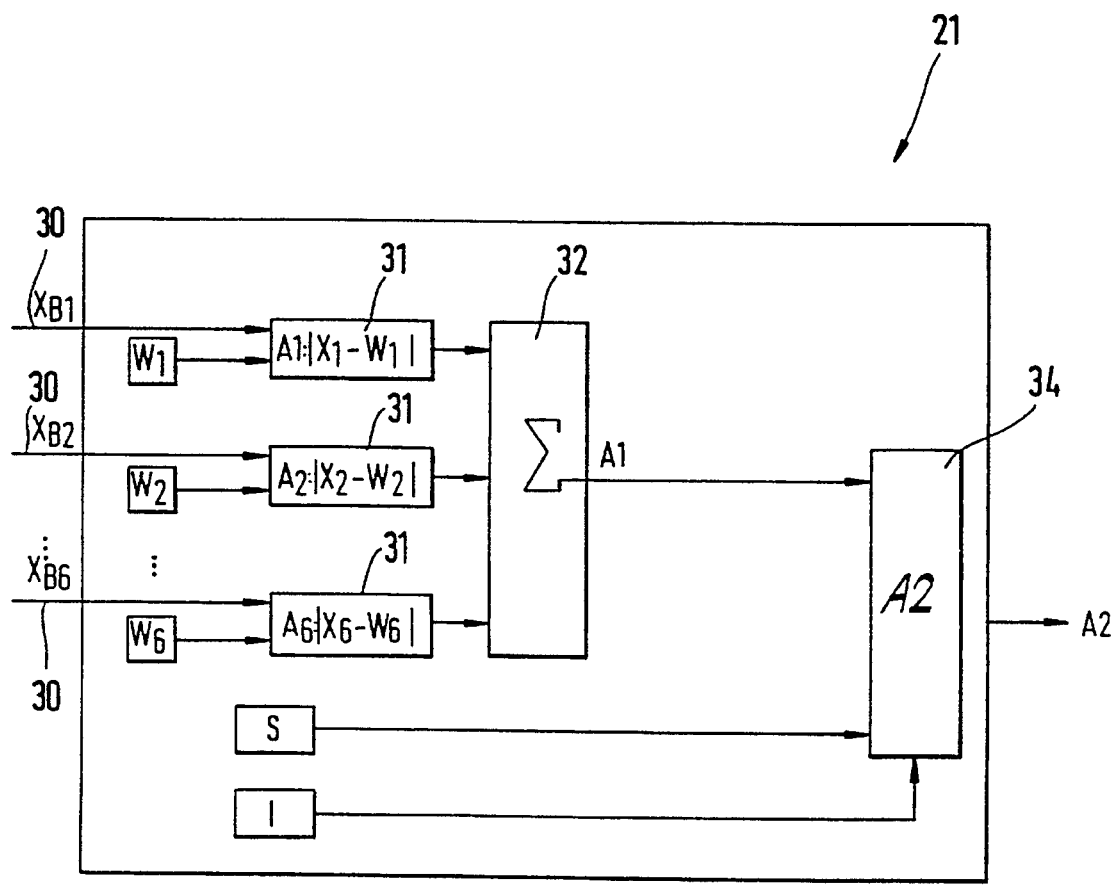
FIG. 3 shows a block diagram of the calculations performed within a processing unit.

Referring now to FIG. 3, there is shown, in detail, a processing unit and the calculations performed within a processing unit, including the calculation of A1, as stated in step 22 of FIG. 2. Here the individual values $x_{B1-B6}$ of the current sample vector $\rightarrow$/$x_{Ba}$ are the input signals 30. From these input signals 30 and the individual values of the weighting vector $\rightarrow$/w determined in the training phase, the size $A_{1-6}$ is determined in a step 31, with $A_{1-6}$ being determined in each case from a pair of individual values $x_i$-$w_i$ that belong together. From all the values of $A_{1-6}$ determined, spacing signal A1 is determined by a summation 32 of these values. The selection of a processing unit takes place with the aid of the spacing signals from all the processing units. From the selected processing unit PE's safety threshold S, and information signal I, output signal A2 is then determined in a step 34.

Referring now to FIG. 4, there is shown a schematic diagram of the selection of the processing unit with the shortest distance from the currently calculated sample vector. Symbolically, reference numeral 40 is used to mark the current sample vector $\rightarrow$/$x_{Ba}$ as the input value. From these input values and the weighting vector of each processing unit 41, as described under FIG. 3, spacing signal A1 is provided with the reference numeral 42 for each processing unit. This is followed by selection 43 of processing unit PE with a smallest spacing signal A1, with spacing signal A1 for each processing unit being calculated, for example, as follows:

$$A1 = \sum_{i=n}^{6} |w_i - x_i|$$

Other calculations of the spacing signal are also possible.

Figure 5:
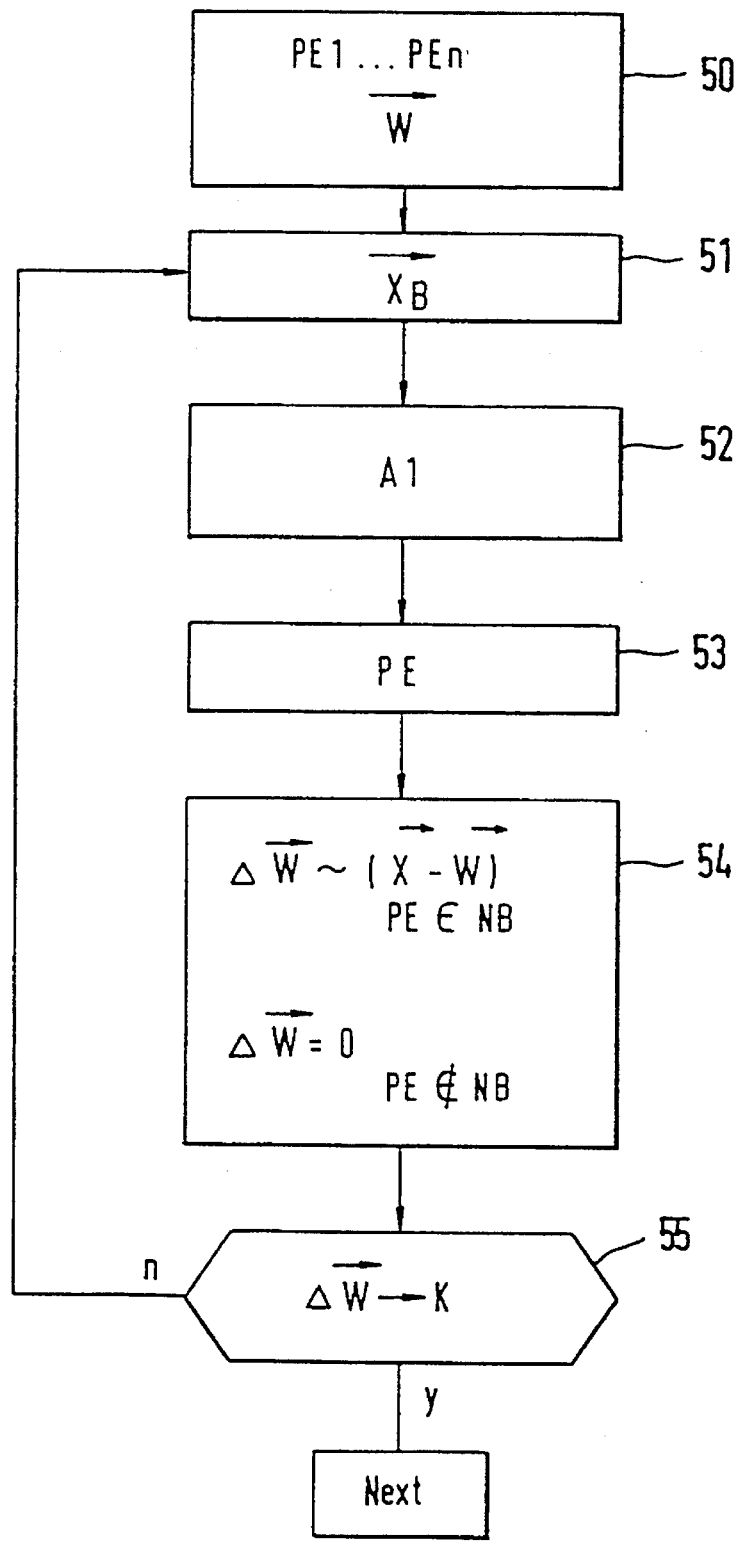
FIG. 5 shows a flow diagram of the determination of the weighting vectors by the further-developed Kohonen model.

Referring now to FIG. 5, there is shown schematically the determination of the weighting vectors on the basis of the Kohonen model. In a step 50, the number of processing units is determined. In a subsequent step 51, a random sample model vector is selected. This sample model vector corresponds to the sample model vectors as previously described in connection with FIG. 1. In a subsequent step 52, the distance A1 between this sample model vector and the weighting vector of each processing unit is calculated as follows:

$$A1 = |w_1 - x_1| + |w_2 - x_2| + \ldots + |w_6 - x_6|$$

After calculating the spacing, in a subsequent step 53, the processing unit at the shortest distance from the sample vector is selected. In step 54 the weighting vector of the processing unit with the shortest spacing and its ajdacent processing units at this point in time are adapted. In a step 55 this value is checked. There is a return to step 51 so that steps 51 to 54 are repeated until the weighting vector converges on a fixed value.

Figure 6:
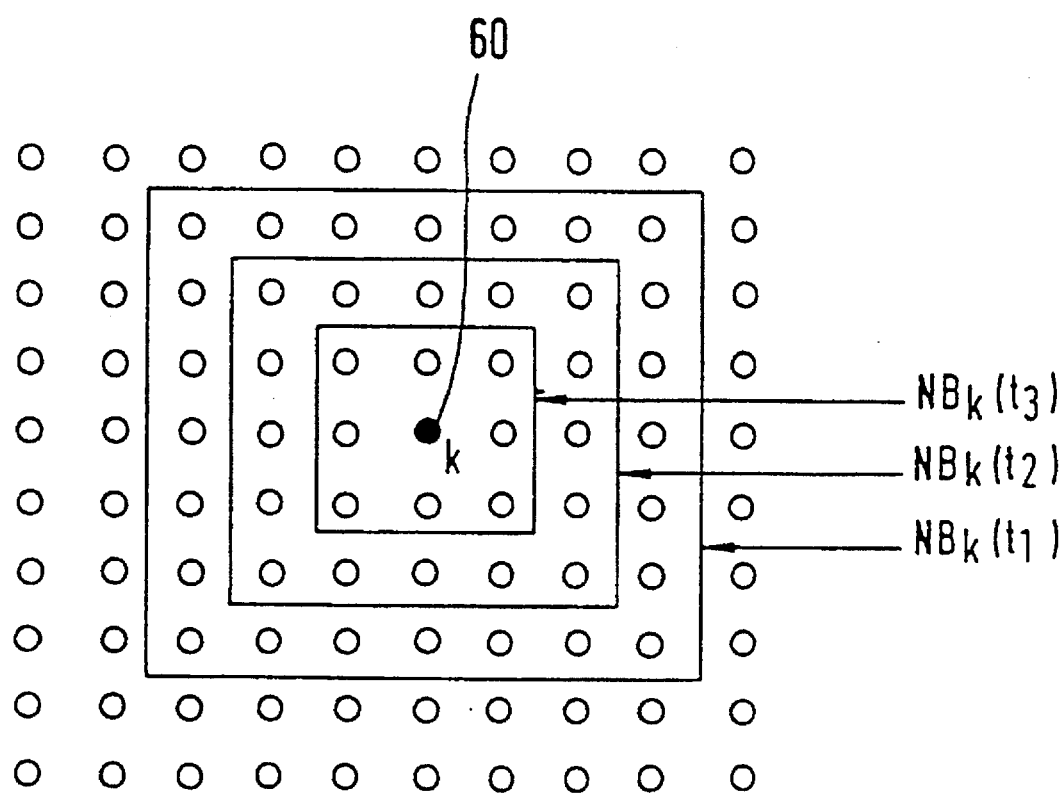
FIG. 6 shows a schematic diagram of a Kohonen model with neighboring areas.

Referring now to FIG. 6, there is shown a schematic diagram of a Kohonen model, with each point representing a processing unit PE. Symbolically, also, the neighboring areas of an emphasized processing unit 60 are shown. In forming neighboring areas, processing units approximately the same distance from the selected processing unit 60 are always combined into a neighboring area.

What is claimed is:

1. A method for misfire recognition in an internal combustion engine, comprising the steps of:

determining a rotational speed of a crankshaft of an internal combustion engine;

determining at least one crankshaft segment for each cylinder of the engine;

determining a segment time for the at least one crankshaft segment of each cylinder as a function of the rotational speed;

determining segment time differences based upon the segment times;

during a first phase, calculating a plurality of processing units as a function of segment time differences determined for a plurality of engine operating points, wherein each processing unit includes a weighting vector and information indicative of a corresponding engine operating point; and storing the processing units in a storage unit;

during a second phase, when the engine is operating, calculating sample vectors as a function of segment time differences determined as the engine is operating; comparing the sample vectors with the weighting vectors of the processing units; selecting at least one processing unit; and evaluating the information included in the at least one processing unit.

2. The method according to claim 1, wherein a processing unit with a smallest spacing signal is selected.

3. The method according to claim 1, further comprising the step of comparing a spacing signal of the selected processing unit to a preselected safety threshold when the information included in the selected processing unit indicates a misfire.

4. The method according to claim 3, wherein the information is not outputted and the steps are repeated without the selected at least one processing unit if the preselected safety threshold is exceeded by the spacing signal.

5. The method according to claim 1, further comprising the steps of diagnosing a functioning of the engine, and outputting the information from the selected at least one processing unit based upon the diagnosis.

* * * * *